Nov. 14, 1967  G. R. WILSON ET AL  3,352,720
POLYMERIC DEPOLARIZERS
Filed March 9, 1964
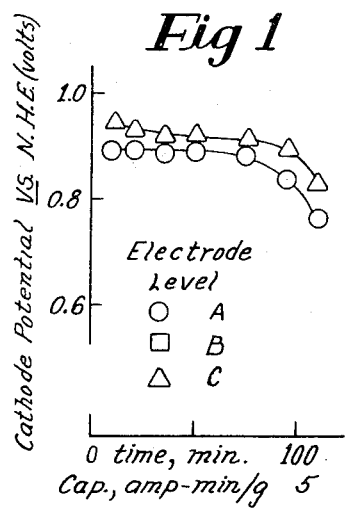
Poly-4-vinylpyridine dibromide
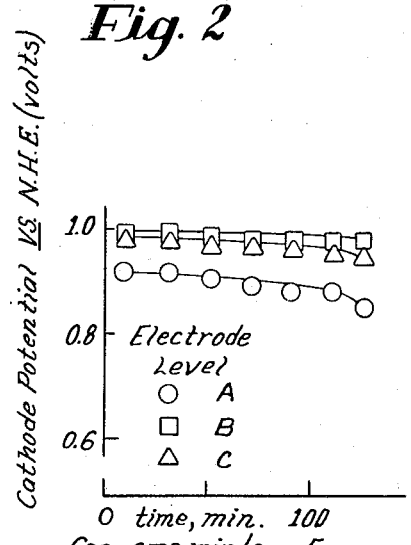
Poly-4-vinylpyridine hydrochloride dibromide
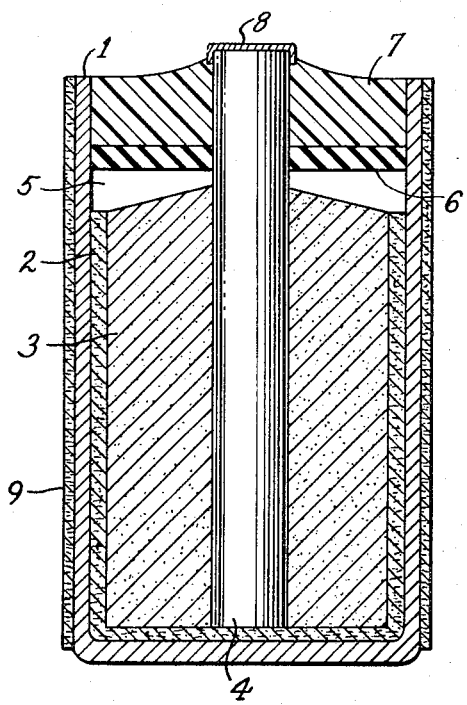
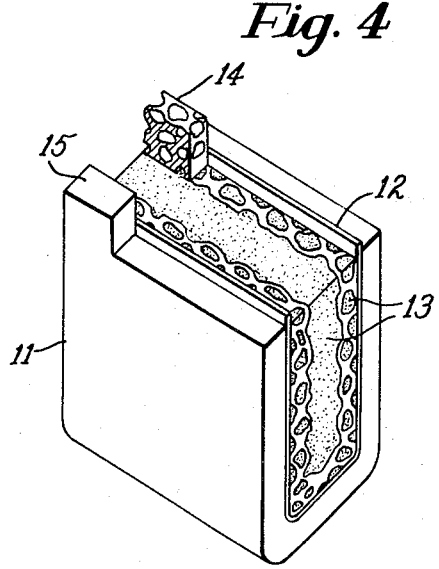
Inventors
Glenn R. Wilson
Elizabeth A. McElhill
By their Attorney

3,352,720
POLYMERIC DEPOLARIZERS
Glenn R. Wilson, 24 Concord Ave., and Elizabeth A. McElhill, 100 Memorial Drive, both of Cambridge, Mass. 02138
Filed Mar. 9, 1964, Ser. No. 350,452
8 Claims. (Cl. 136—137)

This invention relates to depolarizers, and more particularly, provides novel voltaic cell systems comprising polymeric cathode depolarizers.

Halogens such as chlorine or bromine are readily reduced electrochemically and can be employed accordingly as cathode depolarizers in voltaic cell systems. The halogens discharge at a high potential, about 1.0 volt referred to the normal hydrogen electrode, which is an advantageously high value compared to inorganic cathode depolarizers such as manganese dioxide, for example. However, the halogens are noxious gases and are therefore difficult and unpleasant to handle. In general, they are not, therefore, readily adaptable to use in either primary or secondary voltaic cell systems.

The halogens form addition compounds with a variety of substances which are electron donors, including particularly tertiary organic amines and quaternary ammonium halides. These amine halogen complex compounds are generally solid materials which can hold quite substantial amounts of halogen. For example, such complexes of amines with halogens may contain 3, 5, or more atoms of halogen per nitrogen atom.

The amine halogen complex compounds can be reduced electrochemically. They discharge readily in an electrochemical system, producing high, flat potentials of the same order of magnitude as the halogens, about one volt referred to the normal hydrogen electrode. These amine halogen complexes do not have the noxious characteristics of the halogens themselves, and are thus more conveniently adapted for use as depolarizers in electrochemical systems. However, the amine halogen complex compounds are generally unstable, and decompose spontaneously, particularly on standing in contact wtih aqueous solutions such as those employed as electrolytes in electrochemical cells. This effectively limits the use of the amine halogen complexes to reserve cell systems, in which the complete electrochemical cell system is assembled only just prior to use of the cell.

It is an object of this invention to provide electrochemical cell systems comprising improved depolarizers.

A particular object of this invention is to provide an improved electrochemical cell system comprising a stable amine halogen complex compound as cathode depolarizer.

These and other objects will become evident upon consideration of the following specification and claims, and the drawings, in which:

FIGURE 1 is a graph of the potential provided by a cathode depolarizer employed in the system of this invention;

FIGURE 2 is a graph of the potential provided by another cathode depolarizer employed in the system of this invention;

FIGURE 3 is a diagrammatic illustration of a vertical section of a dry cell prepared in accordance with the invention; and FIGURE 4 illustrates an embodiment of the cell system of this invention in a reserve cell.

It has now been found that a polymeric amine halogen complex provides an advantageous depolarizer for use in electrochemical cell systems.

The readiness with which the stated polymeric depolarizers undergo electrochemical reduction is in contrast to the inactivity of other organic polymeric materials containing reducible functional groups. For example, the monomeric nitrobenzenes are organic compounds which act as cathode depolarizers in electrochemical systems, by electrochemical reduction of the nitro groups attached to the benzene ring. Polystyrene can be nitrated to provide a polymer in which a chain of benzene rings having from 1 to 2 nitro substituents per ring are linked by ethylene radicals.

It has been found that this polymeric product containing nitrobenzene rings, unlike the monomeric nitrobenzenes, does not reduce electrochemically. Surprisingly, however, the presently provided polymeric depolarizers, in which the active depolarizing group is a complex of an amine group with a halogen, discharge electrochemically very smoothly and rapidly.

The polymeric amine halogen complex compounds, unlike the corresponding monomeric amine halogen complexes, are stable materials which remain unchanged on storage for long periods of time.

Accordingly, the presently provided electrochemical cell systems have the advantages of including a depolarizer which gives the high discharge potential characteristic of halogen cathode depolarizers, which is a solid, nonvolatile material free of the unpleasant and inconvenient characteristics of halogen gases, and which is storage-stable.

Moreover, the presently employed polymeric amine halogen complexes have the advantages of reversibility and self-sufficiency.

Electrochemical cell systems including the polymeric halogen amine compounds as cathode depolarizers, after electrochemical reduction of the halogen material during generation of electrical current, can be operated in the reverse direction, by introducing electrical current, to regenerate the halogen amine complex. Thus these electrochemical cell systems can be employed not only as primary cells, which are discarded after exhaustion of the reactants, but also if desired as secondary voltaic cells, which are alternately used to produce electrical power and regenerated by supplying electrical power to the system.

Some depolarizers, such as the nitrobenzenes for example, are reduced by a reaction in which another cell system component (water, in the case of the nitrobenzenes) is consumed. The effective weight-to-power output ratio of electrochemical systems based on such depolarizers is considerably increased by the weight of this additional component of the electrochemical reduction reaction. The presently employed polymeric amine halogen complex depolarizers, however, are self-sufficient, only the halogen atoms of the molecule being converted in the electrochemical reaction, thus minimizing the weight of systems using these depolarizers.

Referring now in more detail to the practice of the present invention, and considering first the polymeric amine halogen complex compounds useful in the practice of the invention, broadly, these polymers include the halogen addition compounds which can be formed with any of a broad variety of nitrogen-containing polymers having repeating units which include amino nitrogen atoms having a degree of substitution greater than secondary. These may be tertiary amine nitrogen atoms or quaternary ammonium nitrogen atoms. The presently contemplated quaternary ammonium nitrogen atoms include those in which three valences of the nitrogen atom are bound to carbon atoms of organic radicals, and the fourth is bound either to a carbon atom of an organic radical or to a hydrogen atom. Thus the stated amino nitrogen atoms with a degree of substitution greater than secondary include tertiary amino nitrogen, tetra-organosubstituted quaternary ammonium salts, and tertiary amine hydrogen acid salts. The anion of the stated salts in preferably a halogen atom, which may be fluorine, chlorine, bromine or iodine. The nitrogen-containing portion of the presently contemplated polymeric depolarizers may accordingly be represented by the formulas

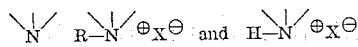

where the 3 dangling valences of the nitrogen atoms are attached to carbon atoms of organic radicals, R is an organic radical attached to the N atom by a C atom, and X is a halogen atom.

The complexed halogen portion of the polymeric depolarizer will be a molecular halogen compound. By the term, molecular halogen, it is not intended to imply that such halogen is not in an ionized state; probably it is. However, the number of halogen atoms complexed will be an even number, corresponding to the two atoms of halogen in one halogen molecule or some even number which is a multiple of two. (It will be appreciated that if the complexing nitrogen atom is part of an amine salt such as a quaternary ammonium halide or tertiary amine hydrohalide, the result will be that the molecule contains an odd number of halogen atoms, overall.) The complexed halogen molecule may be an individual halogen such as bromine, chlorine or iodine. Bromine is especially preferred. The interhalogens can also be the complexing halogen material, such as ICl, IBr, ClBr and the like. The complexed halogen may also be a polyhalogen such $ICl_3$, $ICl_5$, $ICl_7$, $BrCl_3$, and so forth. A plurality of molecules of halogen may be complexed in the present compounds, particularly when the complexed halogen is a simple diatomic molecule.

The nitrogen-containing repeating unit of the presently useful polymers, complexed with halogen as stated, briefly, may include aliphatic or aromatic radicals or both, as the organic radicals attached to the amino nitrogen atoms. The presently useful polymers may be prepared by addition polymerization of unsaturated monomers: for example, suitable polymers with aliphatic radicals attached to the nitrogen-containing units are poly(diethylvinylamine) and poly(trimethylvinylammonium bromide):

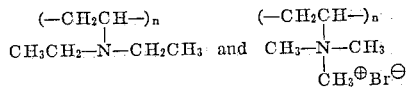

($n$ above and hereinafter indicates the number of repeating units in the polymer, which may range from 1500 to 15,000, for example.)

Condensation reactions such as the reaction of a secondary amine with an organic halide can also be used to produce polymers with suitable repeating units such as poly(N-methylethylenimine) and quaternization products such as poly(dimethylethylenammonium chloride):

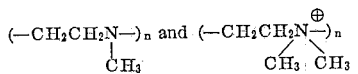

Preferably the present polymers will contain aromatic (conjugated ring) unsaturation. This type of polymer includes aminomethylated styrene polymers such as poly(dimethylaminomethylstyrene) and corresponding quaternized materials such as the product of quaternizing the stated styrene polymer with methyl chloride, poly(trimethyl(vinylbenzyl)ammonium chloride)

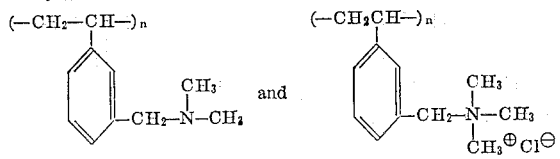

As is known, this type of polymer is usually prepared by polymerizing styrene and subsequently treating the polystyrene to introduce the aminomethyl substitutent.

Still more preferably, the nitrogen is attached to ring carbon atoms of a ring system with aromatic conjugated unsaturation. This class of polymers includes, for example, polymers of dimethylaminostyrene and the corresponding hydrohalides such as the hydrochloride:

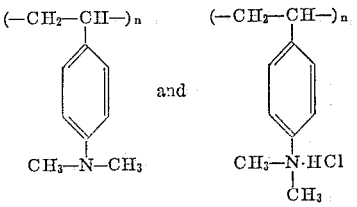

Especially preferably, the stated nitrogen is endocyclic, that is, is a member of a heterocyclic ring system. For example, this type of repeating unit may be provided by polymerizing N-vinylpyrrolidinone or N-vinylcarbazole

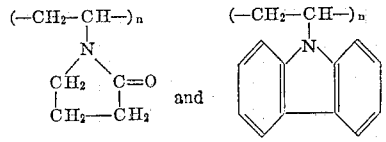

Still more preferably, the nitrogen atom is endocyclic and forms part of a heterocyclic ring system with aromatically conjugated unsaturation. Exemplary of the polymers having this type of repeating unit are the polymers of 2- and 4-vinylpyridine, vinylquinoline, and the like:

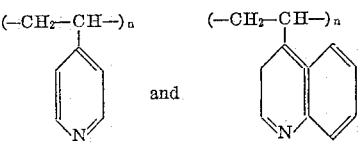

In the presently contemplated polymers, the repeating units containing the stated nitrogen atoms may provide part or all of the repeating units in the polymer. Thus the presently contemplated polymers include copolymers of monomers containing nitrogen atoms of the above-described nature such as vinylpyridine, vinylquinoline, N,N-dimethylaminostyrene or the like with comonomers devoid of amino nitrogen atoms such as butadiene, divinylstyrene, acrylonitrile and the like. In general, to minimize the weight of polymer needed to achieve a given depolarizer activity, desirably at least half of the repeating units in the presently contemplated polymers will contain nitrogen atoms of the stated nature.

As a general rule, the radicals attached to the nitrogen atoms in the repeating units of the present polymers which are complexed with halogen are conveniently hydrocarbon radicals. The hydrogen atoms of these radicals may, however, if desired be replaced by non-interfering substituents such as chlorine, hydroxy or the like.

Illustrative of polymers which may be employed in accordance with this invention having aliphatic radicals attached to the nitrogen-containing units are:

poly(diethylvinylamine dibromide),
poly(dimethylvinylamine hydrochloride dibromide),
poly(dimethylvinylamine hydrochloride dichloride),
poly(dibutylvinylamine dibromide),
poly(dimethylvinylamine iodide heptachloride),
poly(diallylvinylamine dibromide),
poly(trimethylvinylammonium bromide diiodide),
poly(trimethyl(vinyloxyethyl)ammonium iodide dibromide),
poly(benzyldimethyl(vinyloxyethyl)ammonium trichloride),
poly(diethylmethylvinylammonium tribromide),
poly(benzyldimethylvinylammonium trichloride),
poly(allyltriethylammonium chloride dibromide),
poly(triethyl(vinylcyclohexylmethyl)ammonium pentabromide),
poly(dimethylethylenammonium chloride dibromide),
poly(dimethylethylenammonium trichloride),
poly(diethylpropylenammonium chloride dibromide),
poly(dimethylpropylenammonium chloride dibromide), poly(diethylethylenammonium chloride dibromide),
poly(dibutylethylenammonium chloride dibromide),
poly(dibutylethylenammonium trichloride),
poly(didodecylethylenammonium trichloride),
poly(butylethylethylenammonium chloride dibromide),
poly(dimethylhexamethylenammonium chloride dibromide),
poly(dimethylhexamethylenammonium trichloride),
poly(diethylhexamethylenammonium trichloride),
poly(dibutylhexamethylenammonium trichloride),
poly(diethylaminoethyl methacrylate dibromide),
poly[(acryloyloxyethyl)diethylmethylammonium triiodide],
poly[(methacryloyloxyethyl)trimethylammonium iodide dibromide]

and the like.

Exemplary of the presently useful polymers containing aromatic (conjugated ring) unsaturation are:

poly(dimethylaminomethylstyrene dibromide),
poly[trimethyl(vinylbenzyl)ammonium chloride dibromide],
poly[trimethyl(vinylbenzyl)ammonium trichloride],
poly[triethyl(vinylbenzyl)ammonium chloride diiodide],
poly[dimethylphenyl(vinylbenzyl)ammonium chloride dibromide],
poly[triethyl(vinylbenzyl)ammonium chloride dibromide],
poly(diethylaminomethylstyrene dibromide),
poly(diethylaminomethylstyrene hydrochloride dibromide),
poly(diethylaminomethylstyrene dichloride),
poly(dibutylaminomethylstyrene dibromide),
poly(dimethylaminomethylstyrene dichloride),
poly(dimethylaminomethylstyrene dibromide),
poly[dodecyldimethyl(vinylbenzyl)ammonium trichloride], and the like.

Exemplary of the presently useful polymers in which nitrogen is attached to a ring carbon atom of an aromatically unsaturated ring are for example:

poly(dimethylaminostyrene dibromide),
poly(dimethylaminostyrene dichloride),
poly(dimethylaminostyrene iodide trichloride),
poly(diethylaminostyrene dibromide),
poly(dimethylaminostyrene hydrochloride dibromide),
poly(diethylaminostyrene hydrochloride dibromide),
poly(diethylaminostyrene hydrobromide dichloride),
poly(dimethylaminostyrene hydrobromide dibromide),
poly(trimethyl(vinylphenyl)ammonium iodide dibromide),
poly(butyldimethyl(vinylphenyl)ammonium tribromide),
poly(triethyl(vinylphenyl)ammonium tribromide),
poly(tetradecyldimethyl(vinylphenyl)ammonium bromide dichloride),
poly(vinyldiphenylamine dibromide),
poly(vinylditolylamine dibromide),
poly(tributyl(vinylphenyl)ammonium tribromide)

and the like.

Exemplary of endocyclic nitrogen polymers useful in accordance with this invention are:

poly(N-vinylpyrrolidinone diiodide),
poly(N-vinylpyrrolidinone dibromide),
poly(N-vinylpyrrolidinone dichloride),
poly(3-vinyl-N-methylpyrrolidone dibromide),
poly(N-vinylpyrrolidinone iodide chloride),
poly(N-vinylpyrrolidinone iodide trichloride),
poly(N-vinylcarbazole dibromide),
poly(N-vinylcarbazole diiodide),
poly(N-vinylcarbazole dichloride),
poly(N-vinylindole dichloride),
poly(N-vinyl-3,7-dimethylcarbazole dichloride),
poly(N-vinylpiperidine dibromide),
poly(N-vinyl-3-propylpiperidine dichloride),
poly(N-vinylpyrrolidine dibromide),
poly(2-methyl-N-vinylpyrrolidine dichloride),
poly(N-vinylmorpholine dibromide),
poly(N-vinylhexahydrophthalimidine dibromide),
poly(N-vinylpiperidine dibromide),
poly(N-vinyl-4-piperidone dibromide),
poly(N-vinylmorpholinone dichloride),
poly(N-vinyl-2-methylmorpholinone dibromide),
poly(N-vinylcaprolactam dibromide),
poly(N-vinyl-2-oxazolidinone dichloride),
poly(N-vinyl-5-methyl-2-oxazolidinone dibromide),
poly(3-methyl-N-vinylpyrrolidinone dibromide),
poly(3-methyl-N-vinylpyrrolidinone dichloride)
poly(3,3-dimethyl-N-vinylpyrrolidinone dibromide),
poly(C-vinyl-N-methylquinolinium iodide dibromide),
poly(C-vinyl-N-ethylisoquinolinium tribromide),
poly(allylpyridine diiodide),
poly(acryloylpyridine hydrochloride iodide bromide),
poly(2-methyl-4-vinylpyridine hydrochloride iodide trichloride),
poly(2-methyl-4-vinylpyridine dibromide),
poly(5-methyl-2-vinylpyridine dibromide),
poly(3-ethyl-5-vinylpyridine dichloride),
poly(5-ethyl-2-vinylpyridine dibromide),
poly(4-methyl-3-vinylpyridine hydrobromide dichloride),
poly(2,3,4-trimethyl-5-vinylpyridine dibromide),
poly(2-isopropenylpyridine dibromide),
poly(5-propyl-2-isopropenylpyridine dibromide),
poly(2-octyl-5-vinylpyridine iodide trichloride),
poly(5-dodecyl-2-vinylpyridine diiodide),
poly(8-ethyl-2-vinylquinoline dibromide),
poly(4-hexyl-5-vinylquinoline dibromide),
poly(5,5-dimethyl-N-vinylpyrrolidinone dibromide),
poly(4-ethyl-N-vinylpyrrolidinone dibromide), the copolymer of vinyl acetate and N-vinyl-2-pyrrolidinone dibromide and the like.

The especially preferred class of the presently employed polymeric organic cathode depolarizers, containing an endocyclic nitrogen atom in a ring having conjugated aromatic unsaturation, is exemplified by the following:

poly(2-vinylpyridine dibromide),
poly(4-vinylpyridine hydrochloride dibromide),
poly(2-vinyl-5-ethylpyridine dibromide),
poly(5-methyl-2-vinylpyridine dichloride),
poly(5-ethyl-2-vinylpyridine hydrochloride dibromide),
poly(2-methyl-5-vinylpyridine hydrobromide dibromide),
poly(3-ethyl-5-vinylpyridine dibromide),
poly(4-methyl-3-vinylpyridine iodide tribromide),
poly(2-isopropenylpyridine dibromide),
poly(5-propyl-2-isopropenylpyridine dichloride),
poly(2-decyl-5-isopropenylpyridine tetrabromide),
poly(2-octyl-5-vinylpyridine dibromide),
poly(2,4,6-trimethyl-5-vinylpyridine hydrochloride dibromide),
poly(3,4,5,6-tetramethyl-2-vinylpyridine dichloride),
poly(2,6-diethyl-4-vinylpyridine hydrochloride dichloride),
poly(2,4-dimethyl-5,6-dipentyl-3-vinylpyridine dibromide),
poly(2-isopropyl-4-nonyl-5-vinylpyridine dibromide),
poly(2-methyl-5-undecyl-6-vinylpyridine hydrochloride dichloride),
poly(3-methyl-2,5-divinylpyridine dibromide),
poly(C-vinyl-N-methylpyridinium iodide tetrachloride),
poly(C-vinyl-N-(phenylpropyl)pyridinium bromide dichloride),
poly(C-vinyl-N-ethylpyridinium tribromide),
poly(C-vinyl-N-butylpyridinium tribromide),
poly(C-vinyl-N-methylpyridinium iodide dibromide),
poly(C-vinyl-N-dodecylpyridinium tribromide),
poly(C-vinyl-N-benzylpyridinium trichloride),
poly(C-vinyl-N-hexylpyridinium iodide dichloride), poly(C-vinyl-N-butylquinolinium tribromide),
poly(2-methyl-5-vinylquinoline dichloride),
poly(2,8-dimethyl-3-vinylquinoline diiodide),
poly(2,3,8-trimethyl-5-vinylquinoline hydrochloride diiodide),
poly(8-ethyl-2-vinylquinoline dibromide),
poly(4-hexyl-5-vinylquinoline dichloride),
poly(5-methyl-1-isopropenylisoquinoline dibromide),
poly(vinylquinoline iodide trichloride),
poly(vinylquinoline hydroiodide dibromide),
poly(1-vinylisoquinoline dichloride),
poly(vinylpyrazine hydroiodide dibromide),
poly(vinylmethylquinoline hydrochloride dibromide),
poly(vinylquinoxaline hydrochloride dibromide),
poly(vinylphenanthroline hydrochloride dibromide),
poly(vinylacridine hydrochloride dibromide),
poly(vinyl-N-methylimidazolium iodide dibromide),
poly(2-methylvinylbenzothiazole dibromide),
the copolymer of butadiene and vinylquinoline hydrobromide diiodide,
the copolymer of isoprene and 2-methyl-5-vinylpyridine dibromide,
the copolymer of acrylonitrile and 5-ethyl-2-vinylpyridine dibromide,
the terpolymer of butadiene,
styrene and vinylpyridine dibromide,
the copolymer of butadiene and isopropenylpyridine dibromide,
the copolymer of butadiene and 2-,3-, or 4-vinylpyridine dibromide,
the copolymer of butadiene and 3-bromo-3-vinylpyridine hydrochloride dibromide,
the copolymer of butadiene and 2,4-dimethyl-6-vinylpyridine diiodide,
the copolymer of butadiene and 5-ethyl-2-vinyl-pyridine dibromide,
the copolymer of (methacryloyloxyethyl)diethylamine dibromide and 4-vinylpyridine dibromide,
the copolymer of butadiene and 2-methyl-4-,5-, or 6-vinyl-N-methylpyridinium iodide dibromide and the like.

The electrochemical cell systems of the present invention are provided by associating a cathode including a depolarizer material comprising the above-described polymeric amine halogen complex compound depolarizers with an anode material and an electrolyte.

The depolarizer material included in the present cell systems may consist essentially of one or more of the stated polymeric depolarizers, or these polymeric depolarizers may if desired be combined with other active depolarizers, including organic depolarizers such as metadinitrobenzene and inorganic depolarizers such as copper oxide and manganese dioxide. In cells including a mixture of depolarizers, the depolarizer discharging at the higher potential will reduce first, and thus where the present polymeric depolarizers which have high reduction potentials are employed in a mixed depolarizer combination, their higher potentials will prevail while a sufficient supply of the polymeric depolarizer lasts. Thus beneficial effects of the cathode depolarizers employed in accordance with this invention can be obtained when they constitute a minor proportion of the total depolarizer content, but sufficient to produce discharge at their characteristic operating voltages, constituting a significant proportion, such as about 10%, of the power output of the cell. Such compositions are intended to be included herein in the class of depolarizer compositions consisting essentially of cathode depolarizers as contemplated by the present invention.

The anode material in electrochemical cell systems of the present invention may be an anodic metal of Groups II and III of the Periodic Table which is high in the electromotive series, such as zinc, cadmium, magnesium and aluminum. In referring to anode metals, it is intended to include not only the pure metal, but also various alloys thereof: properties of the stated Group II and III metals such as ease of fabrication, corrosion resistance and the like are frequently improved by alloying the metal with small amounts of other metallic materials, such as mercury for example. In such alloys, the electrochemically active metal will comprise at least about 50% by weight of the total alloy weight, and more usually, above about 90% by weight of the total. The anode metal may be a combination of more than one of the above named anode metals.

The cell system will include an electrolyte as a means of providing ionic while excluding electronic contact between the anode metal and the cathode depolarizer. This may be a fluid electrolyte with the latter preferably provided in a bibulous separator permeated by the electrolyte.

The electrolyte fluid will usually be a solution of a soluble ionizable salt. The cation of the ionizable salt may be an alkali metal such as lithium, sodium, or potassium, an alkaline earth metal such as magnesium, zinc, strontium, cadmium or barium, or a non-metallic ion such as the ammonium ion. The anion of the salt may be a halide such as chloride, bromide, and the like, an oxyhalide such as perchlorate, and so forth. Usual electrolyte solutes such as ammonium bromide can be employed to good effect; particular preferred ionizable salts generally will depend on the nature of the halogen complex in the amine-group-containing polymeric depolarizer, the selected anode metal, and so forth.

The solvent employed to produce the fluid electrolyte may be water, or alternatively it may be an ionizing organic solvent. The ionizing organic solvents are those with dielectric constants at least $\frac{1}{10}$th that of water, such as dimethylformamide, dimethylsulfoxide, and the like.

Bibulous separators which may be permeated by the stated fluid electrolytes may comprise porous cellulosic materials like absorbent paper such as kraft paper, woven materials such as cotton fabric, gel-like materials such as carboxymethyl cellulose, a starch gel and so forth, alone or in combination. Useful starch gels are prepared by combining starch or a mixture of starch and a cereal flour such as wheat flour with the fluid electrolyte, following which gelatinization may be produced by action of the electrolyte, by heating and so forth. Other porous organic materials such as films of a plastic like porous polyethylene, or morganic porous products such as ceramis or glass can be used. Ion exchange membranes may also be used as separators, in which case the separator itself may perform the functions both of separator and of electrolyte.

The electrolyte may advantageously contain corrosion inhibitors which protect the anode metal. Exemplary of these inhibitors are the inorganic salts such as barium chromate, mixtures of barium chromate with lithium chromate and the like, organic inhibitors such as 8-chloroquinoline and so forth.

The present invention may be embodied in either primary or secondary cells; the cells may be either fully charged or of the reserve cell type. In reserve cells, one component, usually the electrolyte, is kept separate from the remainder of the system until just prior to use of the cell.

The anode metal may be in the form of a powder, film, or sheet of sufficient thickness to possess structural rigidity. Physical configurations of anode metal sheets may be those of conventional cell structures such as grids and sheets where flat cell constructions are used, and cups serving as containers for the cathodic portion of the cell for round (cylindrical) cell constructions. Leads may be provided for connecting the anode metal to complete the electrical circuit in employing the cell system, or direct contact can be made with an exterior face of the anode structure for this purpose.

Cathode depolarizers are usually poor electrical conductors and are associated in the cathode structure with additional cathode components, including a cathode current collector. The stated current collector will provide the means of making an electrical connection to the cathode depolarizer to complete an external circuit, and is usually a coherent structure possessing electrical conductivity made of a substance which is desirably an inert conductive material such as conductive carbon. A conductive graphite rod or bar is suitable, particularly for use in cylindrical dry cells. A sheet or mesh of a conductive metal, such as silver or titanium for example, is suitable for flat cell constructions.

In the bulk of the cathode depolarizer mass contacting the stated current collector, the cathode depolarizer is advantageously associated with an electronically conductive inert particulate material distributed throughout the mass. This conductive material will normally be a conductive carbon of the kind known as a battery black. Generally this is a black produced by pyrolysis of an unsaturated carbon compound such as an acetylene black. The ratio of conductive carbon to cathode depolarizer may vary, for example, between 90:10 and 10:90 (by weight), but is generally about 50:50. The cathode depolarizer, which, as stated, would usually be associated with conductive carbon particles in a mixture designated the cathode mix, may also have admixed therewith electrolyte solution permeating the cathode mix, additional cathode depolarizer materials, binders such as polyvinyl alcohol, and so forth.

It is to be appreciated that the present polymeric depolarizers can be formed and shaped, so that to provide flat cells for example, sheets of anode metal may be covered by a sheet of separator material which can be impregnated with electrolyte solution and a conductive sheet of the polymeric depolarizer laid over this, providing a cell construction which can if desired be stacked to produce batteries of cells.

The polymeric depolarizers employed in cell systems in accordance with this invention can also be coated onto a tape separator which may be employed to feed a fuel cell system as described in copending application S.N. 232,144, filed Oct. 22, 1962, by Bernard A. Gruber, now U.S. Patent 3,260,620, owned by the same assignee as the present application, the description of which is incorporated herein by reference.

The invention is illustrated but not limited by the following examples.

*Example 1*

This example describes measurement of the potential provided by a cathode depolarizer employed in the systems of this invention, referred to the normal hydrogen electrode.

The cell used consists of a methacrylate polymeric body with calomel reference electrode openings provided at different levels so that potentials can be determined as a function of distance from the anode. The A level is at the bottom of the cake (high current density), the B level is at the top of the cake, and the C level values are measured just above the cake (lower current density.)

Experimental apparatus for the half cell measurements is thermostated at 30° C. A mixture of the depolarizer with carbon black is placed in the cell on a cation exchange membrane, below which is positioned a counter electrode consisting of a carbon rod about ½ inch in diameter.

The volume of electrolyte introduced is just enough to wet the cathode slug from top to bottom. A graphite pressure disc is placed over the cathode mix to provide electrical contact between the mix and a graphite rod to which external connections are made. A 550 gram weight is attached to the carbon rod to insure reproducible contact of the graphite with the cathode cake.

Electrical connections are made to the counter electrode, the graphite rod contacting the pressure disc, and the saturated calomel electrodes. The cathode is driven by lead-acid storage batteries connected in series, which are in series with a milliammeter and a variable resistance. A voltmeter is included in the circuit between the calomel electrode and the working electrode.

At 0.025 ampere (0.05 ampere per gram depolarizer) in this cell with approximately 0.2 square inch area, the projected average area current density is 0.127 ampere per square inch.

The charge used in measuring the potentials plotted in the figures is a mixture of 0.5 g. of depolarizer and 0.25 g. of conductive carbon (Shawinigan acetylene black), and the electrolyte is an aqueous solution of 168 g. per liter ammonium bromide.

The potentials measured with this cell for poly-4-vinylpyridine dibromide are shown in FIGURE 1. From this figure it may be seen that the voltages at both high and low current density are nearly identical, and the potential delivered is high, between 0.8 and 1.0 volt referred to the normal hydrogen electrode, and substantially flat out to the point at which the capacity of the depolarizer is exhausted.

*Example 2*

This example further illustrates cathode depolarizer characteristics of polymeric depolarizers employed in accordance with this invention.

The equipment described in Example 1 is used to measure potentials delivered, referred to the normal hydrogen electrode. The cathode mix is an 0.5 gram charge of polyvinylpyridine hydrochloride dibromide mixed with 0.25 g. of carbon black and wetted with a solution of 168 g. ammonium bromide per liter of water. The potential delivered (see FIG. 2) over a time period of 2 hours is high, substantially flat, and little different at high and at low current densities.

*Example 3*

This example illustrates preparation of the polymeric cathode depolarizers employed in Examples 1 and 2. An emulsion is prepared by dissolving 0.15 g. of benzoyl peroxide in 77 g. of freshly distilled 4-vinylpyridine, adding a solution of a surfactant in 150 ml. of water and shaking the mixture. The emulsion is then heated and stirred under nitrogen for 4 hours in 50–60° C. The polymer which precipitates from the solution is washed with water and dried, dissolved in t-butyl alcohol, frozen and the solvent evaporated to provide polyvinylpyridine as a powder.

To produce the addition compound of the polymer with bromine, 5 g. of the polyvinylpyridine prepared as above stated is dissolved in 100 ml. of chloroform and 9 g. of bromine added to the solution. The polyvinylpyridine dibromide separates immediately as a precipitate, which is filtered off and washed with chloroform and petroleum ether. The product is a yellow powder which does not melt, but darkens, on heating to 200° C. A standard analytical method for determining active halogen indicates only 60% of theoretical for a 1:1 complex, but 94% of theoretical weight of product for a 1:1 complex is isolated.

To prepare the polymer hydrochloride dibromide, polyvinylpyridine is dissolved in chloroform and gaseous hydrogen chloride is passed into the chloroform solution. This precipitates the polyvinylpyridine hydrochloride. A twofold excess of bromine is added, and the mixture is allowed to stand two days. The product resembles polyvinylpyridine dibromide: it is a yellow solid which does not melt at up to 200° C. The product weight is 93% of theoretical for a 1:1 complex.

A portion of the polyvinylpyridine dibromide is reserved and placed in shelf storage (temperature about 70° F.) for a month. It remains stable through this time, in contrast to monomeric heterocyclic amine halogen addition compounds such as pyridine dibromide and gamma-picoline dibromide, which decompose on standing overnight.

Example 4

This example illustrates an exemplary embodiment of the cell system of the present invention in which the cathode depolarizer is coupled with an anode metal through an electrolyte, as illustrated in FIGURES 3 and 4.

FIGURE 3 is a diagrammatic illustration of a vertical section of a dry cell prepared in accordance with the invention, in which 1 is a cup of magnesium, 2 is a separator made of porous material such as kraft paper lining the interior of the cup and 3 is a cathode mix prepared by combining acetylene carbon black particles and a polymeric amine halogen addition compound in a depolarizing amount. For example, this may be a 50:50 by weight mixture of polyvinylpyridine dibromide and acetylene black. The paper separator and the cathode mix are permeated by a liquid electrolyte which may be, for example, an aqueous solution saturated with barium chromate and further containing a concentration of 1 gram per liter of lithium chromate and having dissolved therein magnesium bromide as an electrolyte, in a concentration of 168 grams per liter. Centrally located in the cell and prevented from contacting the exterior 1 by the separator 2 is a carbon rod 4 which is the cathode current collector. An air space 5 above the top of the cathode mix intervenes between it and an insulating washer 6 and a seal 7 over the top of the cell. A cap 8 provides an electrical connection to the cathode current collector 4 and a jacket 9 covering the exterior of the can 1 insulates it from contact on the can sides while leaving the bottom free for making electrical contact.

Connection of the cell system is made, by a cathode lead attached to the cap 8 and an anode lead contacting the bottom of the can 1, into a completed electrical circuit (not shown) in which the current generated is passed through a resistance. The magnesium/polymeric depolarizer above-described system generates a potential of 2.35 volts, which is sustained as the current drain is continued.

FIGURE 4 illustrates an embodiment of the cell system of this invention in a reserve cell. An external open-sided jacket 11 of magnesium is lined internally by a porous separator 12 made of kraft paper and centrally positioned is a rectangular cathode mix block 13 of a mix of acetylene black and polyvinylpyridine dibromide. Embedded in the stated mix is a mesh of titanium gauze having a tab 14 extending externally, providing means for cathode connection to the cell. A tab 15 integrally joined with the external magnesium jacket 11 provides an anode connection. To operate this cell, it is immersed in an electrolyte comprising an aqueous solution of ammonium bromide and connected to a complete electrical circuit (not shown). The discharge characteristics are like those of the dry cell of FIGURE 3. If the cell is disconnected from the load after partial discharge and driven in the reverse direction, the amine halide complex compound is regenerated, and the cell can be operated thus in alternate cycles of charge and discharge.

While the invention has been described with reference to various specific preferred embodiments thereof, it is to be appreciated that modifications and variations can be made without departing from the scope of the invention, which is limited only as defined in the appended claims.

What is claimed is:

1. A voltaic cell comprising an anode material, a cathode depolarizer material, and an electrolyte, in which said cathode depolarizer material is a complex compound of halogen molecules with the nitrogen atoms of a polymeric amine in which the nitrogen-containing repeating units contain amino nitrogen atoms with a degree of substitution greater than secondary, wherein said nitrogen atoms are part of an aromatically unsaturated heterocyclic ring.

2. The cell of claim 1 in which said nitrogen atoms are tertiary amine nitrogen atoms.

3. The cell of claim 1 in which said nitrogen atoms are quaternary ammonium atoms.

4. The cell of claim 3 in which said quaternary ammonium nitrogen atoms are tertiary amine hydrohalides.

5. A voltaic cell comprising an anode material, a cathode depolarizer material and an electrolyte, in which said cathode depolarizer material is a complex compound of halogen molecules with the nitrogen atoms of a polymeric amine in which the nitrogen-containing repeating units contain amino nitrogen atoms which are tertiary amine hydrohalides.

6. The cell of claim 5 in which the nitrogen atoms are part of an aromatically unsaturated heterocyclic ring.

7. An electrochemical cell comprising an anode material, a cathode depolarizer material and an electrolyte, in which said cathode depolarizer material comprises the addition compound of polyvinylpyridine with bromine.

8. An electrochemical cell comprising an anode material, a cathode depolarizer material and an electrolyte, in which said cathode depolarizer material is the addition compound of bromine with polyvinylpyridine hydrochloride.

References Cited

UNITED STATES PATENTS

| | | | |
|---|---|---|---|
| 2,874,079 | 2/1959 | Lozier et al. | 136—137 |
| 2,880,122 | 3/1959 | Morehouse et al. | 136—137 |
| 3,057,760 | 10/1962 | Dereska et al. | 136—137 |
| 3,231,427 | 1/1966 | Kirk et al. | 136—136 X |

WINSTON A. DOUGLAS, *Primary Examiner.*

D. L. WALTON, *Assistant Examiner.*